R. D. CONNOR.

METHOD AND APPARATUS FOR DRAWING WIRE.

APPLICATION FILED FEB. 3, 1921.

Reissued Oct. 11, 1921. 15,205.

4 SHEETS—SHEET 1.

Inventor:
R. D. Connor
By Fowler & Kennedy
Attorneys.

R. D. CONNOR.

METHOD AND APPARATUS FOR DRAWING WIRE.

APPLICATION FILED FEB. 3, 1921.

Reissued Oct. 11, 1921. 15,205.

4 SHEETS—SHEET 2.

Inventor:
R. D. Connor
By Fowler & Kennedy
Attorneys.

R. D. CONNOR.

METHOD AND APPARATUS FOR DRAWING WIRE.

APPLICATION FILED FEB. 3, 1921.

Reissued Oct. 11, 1921. 15,205.

4 SHEETS—SHEET 3.

Inventor:
R. D. Connor
By Fowler & Kennedy
Attorneys.

R. D. CONNOR.

METHOD AND APPARATUS FOR DRAWING WIRE.

APPLICATION FILED FEB. 3, 1921.

Reissued Oct. 11, 1921. 15,205.

4 SHEETS—SHEET 4.

Inventor:
R. D. Connor
By Fowler & Kennedy
Attorneys.

UNITED STATES PATENT OFFICE.

ROBERT DUNCAN CONNOR, OF WITHINGTON, MANCHESTER, ENGLAND.

METHOD AND APPARATUS FOR DRAWING WIRE.

15,205. Specification of Reissued Letters Patent. Reissued Oct. 11, 1921.

Original No. 1,198,111, dated September 12, 1916, Serial No. 57,305, filed October 22, 1915. Application for reissue filed February 3, 1921. Serial No. 442,314.

*To all whom it may concern:*

Be it known that I, ROBERT DUNCAN CONNOR, a subject of the King of Great Britain and Ireland, and resident of Withington, Manchester, England, have invented new and useful Improvements in Methods of and Apparatus for Drawing Wire, of which the following is a specification.

The present invention relates to the art of drawing wire, the same involving important departures from the methods practised and the apparatus employed in previous wire drawing operations. The improvements are particularly shown and described in relation to wire drawing by the continuous method, though obviously applicable and useful in wire drawing operations where only a single draft is required.

In continuous wire drawing as heretofore practised, the machines provide a series of drawing blocks or drums, one associated with each die,—each block carrying a definite and unvarying number of turns of wire and serving as a capstan from which the wire passes off tangentially at the exact speed which the rotation of said block permits it to unwind. The nature of the operation as heretofore carried out is such that the actual amount or weight of wire passing onto and off of any block in a given time must always be almost exactly the same as that passing onto and off of every other block in the same time; in other words, it has invariably been the practice to increase the peripheral speeds of successive blocks as closely as possible in proportion to the elongation of the wire between said blocks; all previous efforts in the art have been concentrated on the development of mechanism for establishing and maintaining as closely as possible the speed relations above set forth, with the end in view of causing each block in a given time to wind up no more and no less wire than is unwound from the preceding block in the same time.

The present invention involves radical departures from the principles that are characteristic of all previous continuous wire drawing operations, in that it eliminates entirely the necessity for accurately, or even approximately, proportioning the peripheral speeds of the blocks to the elongation of the wire, and also in that it wholly discards the mode of operation common to all previous continuous operations of having each block handle in a given time the same amount or weight of wire as every other block. According to the present invention, the drawing block or blocks operate not only as capstans to pull the wire through the preceding die, but also serve as storage devices, or accumulators, for slack wire, which may be removed therefrom by uncoiling, as distinguished from unwinding; in this way, when drawing wire by the continuous method, the reduction accomplished by any die may be either greater or less than that implied by the relative speeds of the blocks preceding and following; also, with either continuous or single block drawing, the wire as accumulated can be utilized, without any intermediate handling, in any kind of wire forming machine,—passing directly to such machine from the drawing block.

The preferred embodiment of the invention is shown in the accompanying drawings, forming a part of the specification, in view of which disclosure the underlying principle of the invention will be understood by those skilled in the art, irrespective of the concrete structure and arrangement selected for illustrative purposes, wherein—

Figure 1:
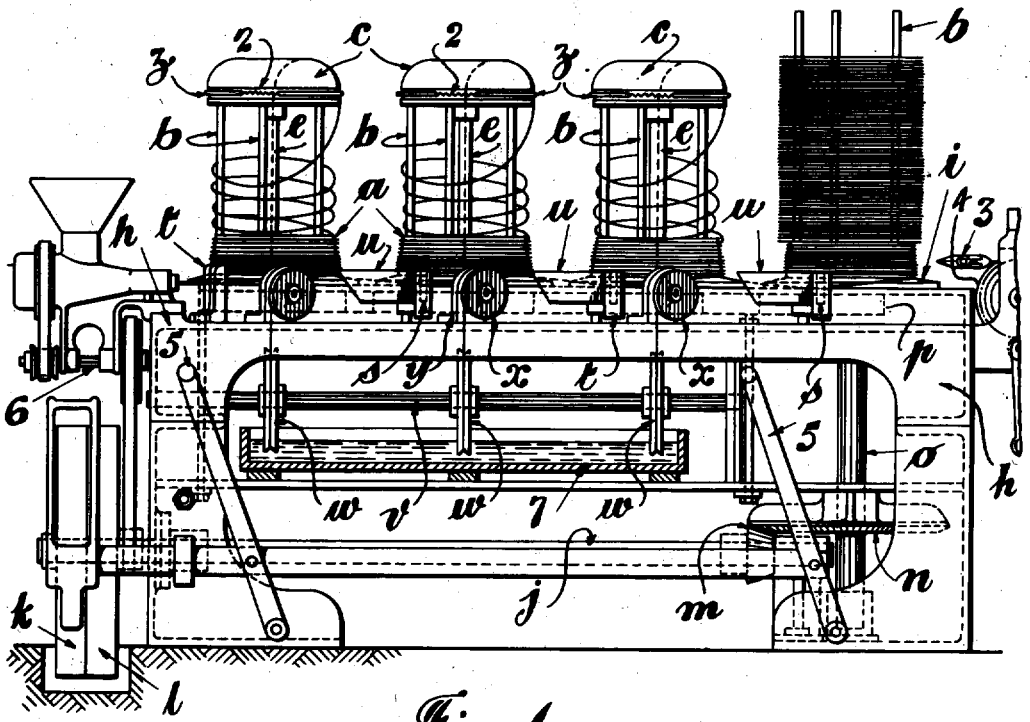
Figure 1 is a side elevation showing a complete machine constructed according to the invention.
Figure 6:
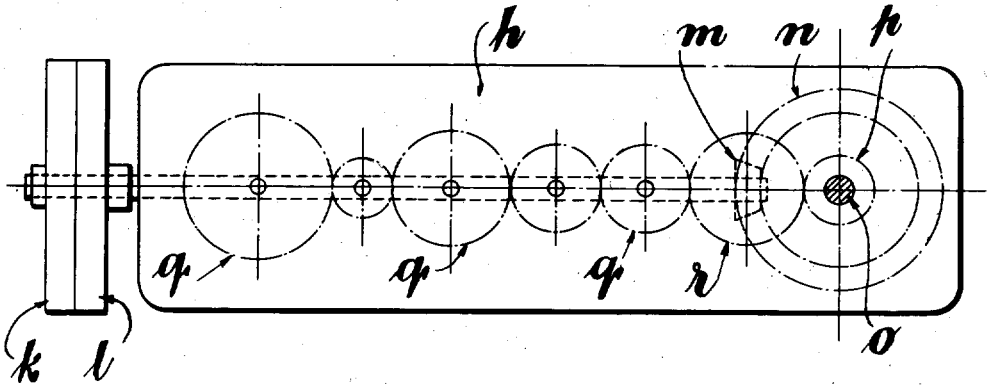
Fig. 6 is a diagrammatic plan of the draw bench, showing the train of gear wheels for rotating the drawing blocks.
Figures 2, 7:
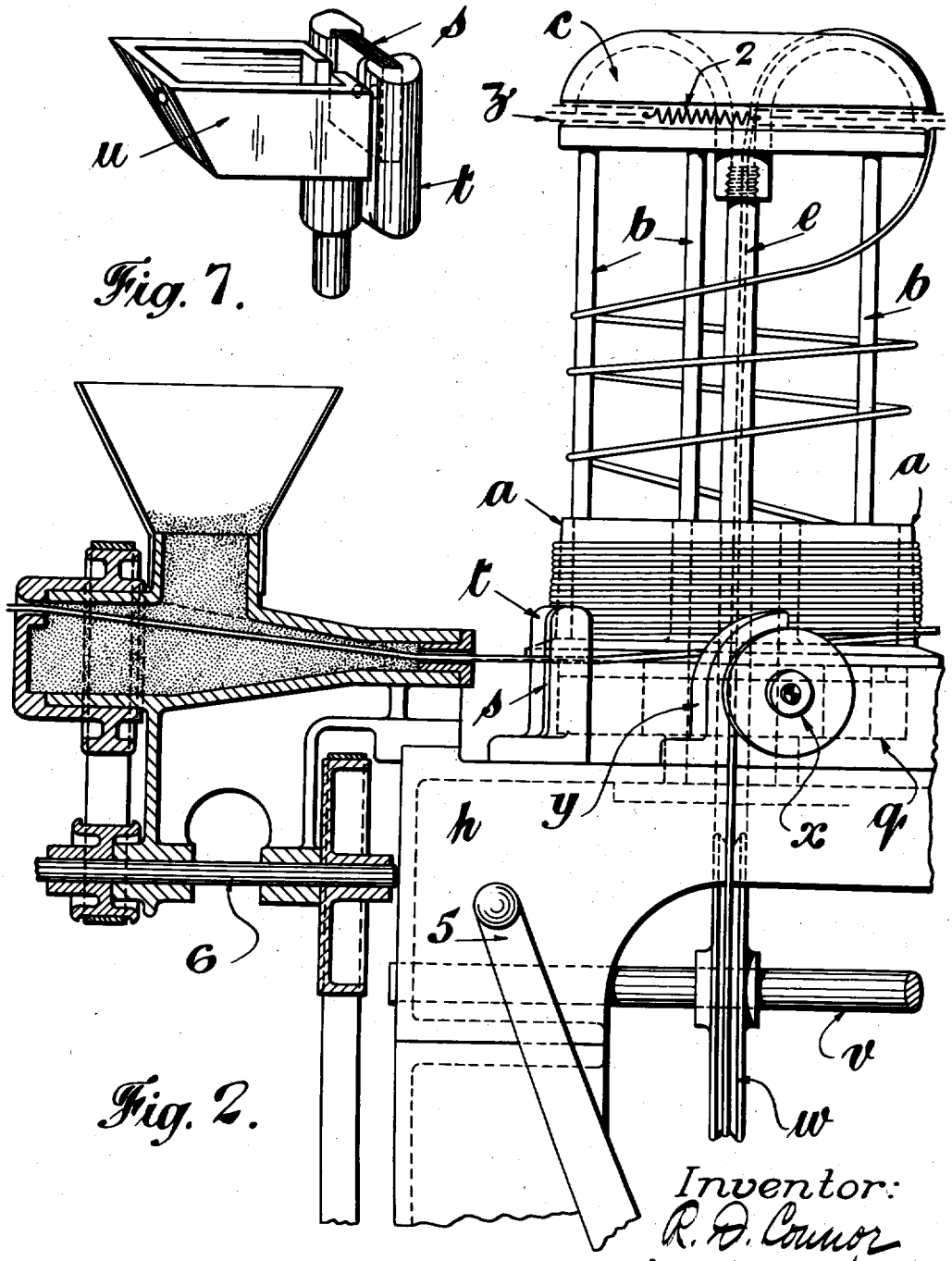
Fig. 2 is a side view of the first drawing block and part of the table, drawn to a larger scale.
Fig. 7 is a perspective view of a combined die holder and trough to receive the lubricant or other treating material.
Figures 3, 4:
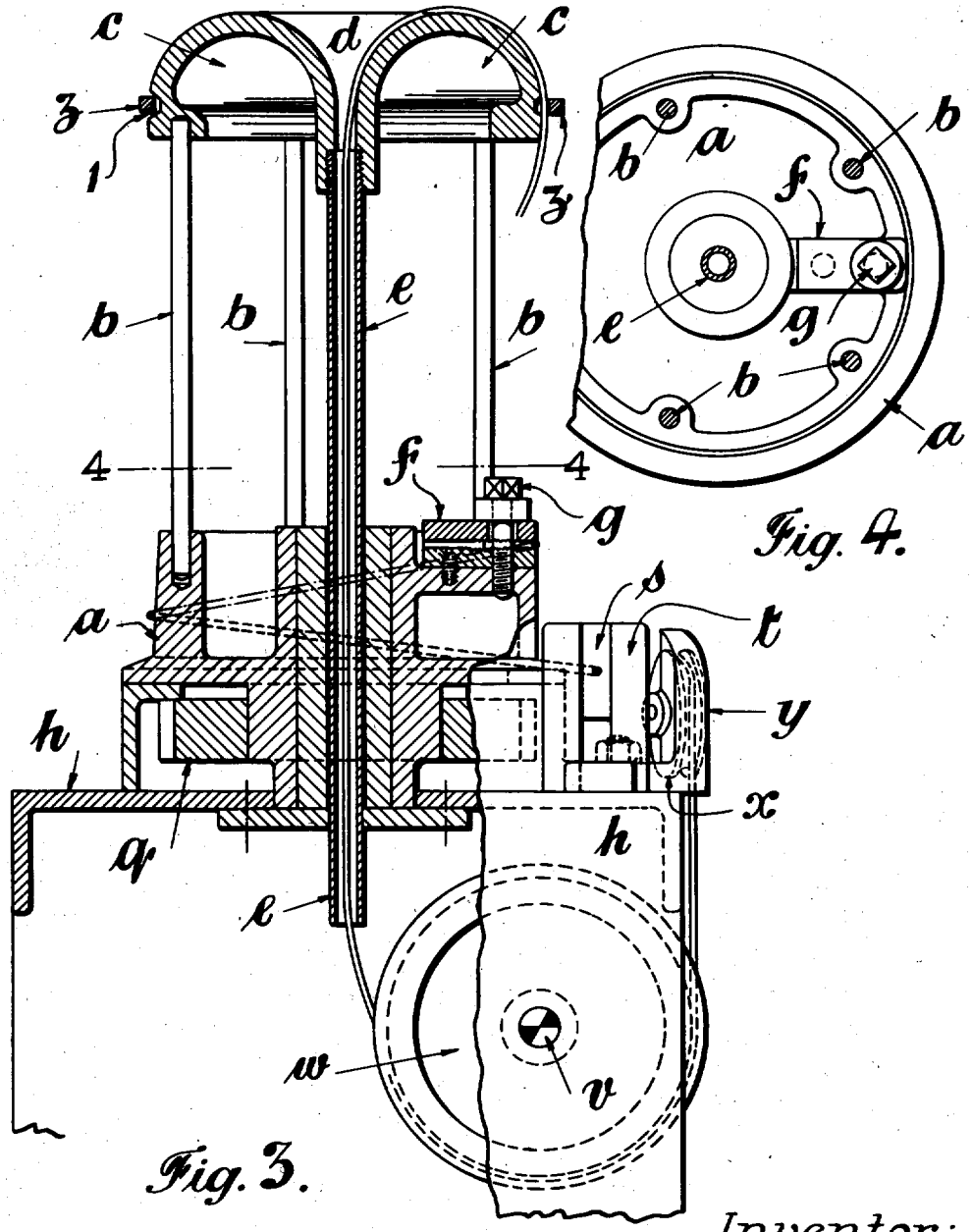
Fig. 3 is a cross sectional view through one of the drawing blocks.
Fig. 4 is a sectional plan on the line 4, 4 of Fig. 3.
Figure 5:
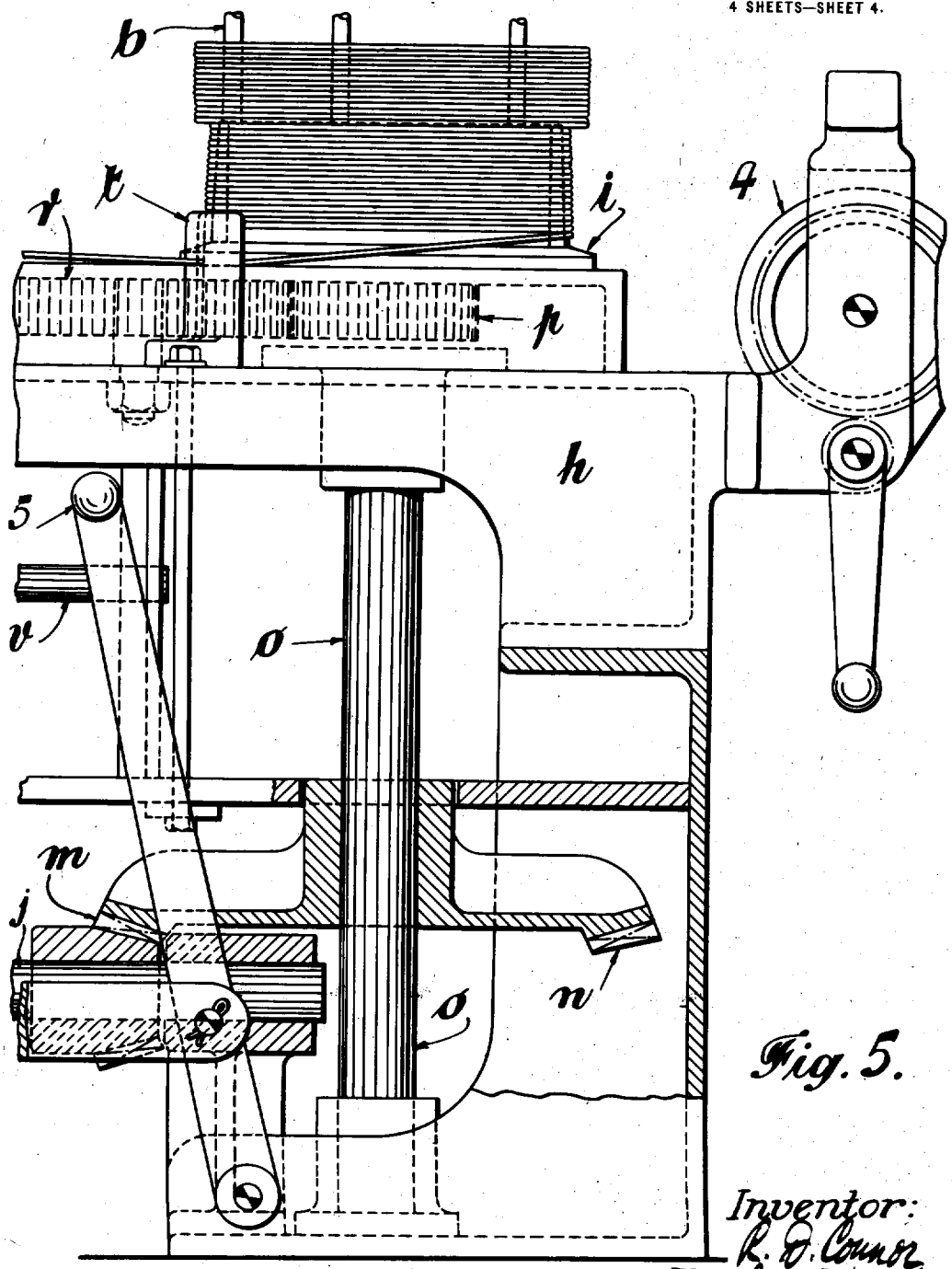
Fig. 5 is a side view, partly in section, showing the drive to the last block on an enlarged scale.

Each drawing block comprises the block proper *a*, adapted to receive a sufficient number of convolutions to cause the tractive effort of the block to draw the wire through the die, and having a reel-like extension adapted to receive the drawn wire. As shown, the latter consists of columns *b* which, with the exception of the final block, support a dome shaped member *c* having a central aperture *d* in line with which depends a central tube *e*, passing centrally through the block and forming a guide for the wire leaving the same.

Means are provided to grip the wire while the initial convolutions are wound on the block, and these may consist of a vise having the gripping jaw *f*, manipulated, or controlled, by the stud *g*.

A table or draw bench *h* is formed to receive a series of drawing blocks, corresponding in number to the desired number of reductions, four being shown on the drawings, the first three being formed with a hollow shaft or pillar as above described, while the last block *i* is adapted to receive the finished wire. The driving shaft *j* is journaled in the bench and is provided with fast and loose pulleys *k* and *l* respectively, to receive the driving belt. Upon the shaft *j* is a beveled wheel *m* which meshes with another beveled wheel *n* secured to and adapted to drive the shaft *o* of the block *i*. Another gear wheel *p* on the shaft *o* drives a gear wheel *q* on the preceding block, through an idler wheel *r*, each block being provided with a corresponding gear wheel *q* and receiving motion from the succeeding block through an idler wheel, the gear ratios being such that the peripheral speed of the blocks, increases from the initial block upward, as hereinafter explained.

Dies *s* are provided for each block, said dies preferably being positioned by a holder *t* formed in one with or secured to a trough or the like *u* for receiving the usual lubricant or other treating material. Beneath the row of hollow drawing blocks and in line therewith is a shaft *v* mounted in the table *h* and adapted to receive guide pulleys *w*, one of which is located beneath the axis of each of said blocks. These pulleys *w*, in conjunction with a second series of guide pulleys *x*, mounted in brackets *y* on the top of the table, are arranged to guide the wire from off each drawing block to the next succeeding die, tensioning or braking devices being provided to prevent slippage of the convolutions on portion *a*, and to regulate the supply of wire drawn off the blocks. Such a tensioning device is conveniently formed by an extensible chain band *z* located in a groove 1 around the dome *c*, an adjustable spring 2 being provided to govern the tension.

Draw tongs 3, operated by a cable from the drum 4, are provided for the initial drawing, and handles 5, 5 are conveniently arranged for manipulating the belt fork from either end of the machine.

The operation of the device is as follows: The undrawn wire is carried on a swift or creel located at the forward end of the machine, said swift or creel preferably being of the tilting type. The end of the wire, after being pointed, is usually led into a soap box through an eccentrically arranged hole in the back thereof, said back being rotated from the driving shaft through the counter shaft 6. The first die is then placed in the last die holder and a short length of wire drawn therethrough, after which said die is returned to its holder, opposite the first block and the end of the wire secured by the jaw *f* in the respective vise. Upon the machine being started, the wire is drawn by the first block until a sufficient number of convolutions are drawn on to it to insure a grip, when the vise is released and the end of the wire passed up under the spring band brake *z*, over the dome *c*, down through the tube *e* and around the respective guide pulleys *w*, *x* to the next succeeding die. The latter is preferably placed in the last die holder for ease of manipulation by the draw tongs, but upon the release of the draw tongs, the die is removed to its respective holder and the cycle of operations repeated as with the first draw block, each succeeding draw block being started in a similar manner until the last is reached, upon which the drawn wire gathers, as will be apparent from the drawings.

With mechanism constructed and arranged as above described, the necessity for accuracy in the several dies is eliminated, as well as the necessity for increasing the peripheral speeds of the successive drawing blocks in proportion to the elongation of the wire,—both of which are essential factors in all previous continuous wire drawing operations. Instead, according to the present invention, the gear ratios of the drawing blocks are normally such that the peripheral speed of each succeeding block is greater than that of the preceding block by an amount rather less than is sufficient to take off the wire from said preceding block, due allowance being made for the elongation of the same. Because of this arrangement, involving a peripheral speed increase for each successive block that need bear no definite relation whatsoever to the elongation of the wire, it follows that the amount or weight of wire that is drawn onto and wound upon each block in a given period of time may be different from, and preferably will normally exceed the actual amount or weight of wire that is drawn off of said block in the same time.

As a consequence of this, during the drawing operation, the number of turns or convolutions of wire wound upon each block gradually increases, the surplus wire accumulating and being held in storage upon the columns *b* of each block. Obviously, each block in this way becomes a variable storage device, the amount of wire accumulated thereon being increased or decreased in accordance with the demands of the next succeeding block. To illustrate, let it be assumed that one of the dies *s* becomes unduly worn and enlarged in the drawing operation; when this occurs in the ordinary type of continuous wire drawing machine, the accumulative tension on the wire will soon effect a breakage, for the reason that in the absence of the predetermined elongation accomplished by the die in question, the demands of its block are not satisfied by the speed at which the wire is unwound tangentially from the preceding block. On the other hand, according to the present invention, the wire which has been gradually accumulated and which is loosely held in storage on such preceding block, is amply sufficient to care for the extraordinary demand of the next succeeding block, when the latter's die becomes worn. Under such conditions, the deficit is supplied by a gradual uncoiling, (as distinguished from unwinding) of the topmost convolutions or turns on the colums *b*, it being obvious that this result is made possible by the fact that the wire comes off the block, not tangentially, as in the ordinary wire drawing, but in a path that permits it to be withdrawn from the block without regard to the fixed rate of rotation of the latter. Under these conditions, with the wire being withdrawn from the top of columns *b* at a rate faster than the block can unwind it, there occurs a relative backward peripheral movement of the point where the tension or braking action of the band *z* is effective. Obviously, with either continuous or single-block wire drawing, this method of removing the wire from a block allows the wire drawing apparatus to be connected up directly with any kind of wire forming machine, such as a nail, spring, or chain-making machine, or the like. Such coördination of mechanism cannot be secured using any previous type of wire drawing apparatus, because of the impossibility of synchronizing the operation of the latter with the operation of the machine in which the drawn wire is used; by the present invention, however, the necessity for synchronism is avoided, since the wire can be delivered from the block, either continuously or intermittently, at any speed made necessary by the character of the forming machine wherein it is utilized.

It is to be noted that the mode of operation of the present invention is made possible by two things,—first, a construction that permits of uncoiling from the top of each block, so that the rate of delivery of wire may be either faster or slower than the fixed peripheral speed imparted to the block, and second, the maintenance upon the wire held in storage on each block, of a slight tension or friction, just sufficient to overcome any tendency to slip on the capstan. In the particular mechanism herein selected for illustrative purposes, the first of these functions is served by the delivery of the wire from each block in a substantially axial direction, and the second by the employment on each block of the peripheral tension band *z;* obviously, the invention is not in any sense limited to the use of these illustrated expedients, but is susceptible of such variations therefrom as come within the scope of the appended claims.

As the supply of wire is exhausted at the feeding end, there is ample time for the machine minder to refill the swift or creel and prepare for the next operation before the wire is exhausted from all the drums. If desired, a trough *7* may be suspended below the guide pulleys *w* containing suitable treating material when it is desired to use the wet process of drawing.

It will be observed that no slipping, pulling or grinding takes place on the drawing blocks, consequently no loss of driving power is occasioned or undue stresses or strains imparted to the wire, thereby permitting the machine to be run at relatively high speeds, and allowing the wire to be drawn down more than heretofore without intermediate annealing. Further, by reason of the wire being caused to accumulate between each pair of dies, it is cooled before reaching the next die, the rotation of the block materially assisting in the effect.

I claim:

1. Apparatus for drawing wire by the continuous method, comprising, in combination, a series of dies, a series of drawing blocks whose speed ratios are such as normally to procure a gradual accumulation of the wire upon each block, and means permitting the withdrawal of the accumulated wire from each block at speeds different from the peripheral speed of said block.

2. Apparatus for drawing wire through a series of reductions continuously in one operation, comprising a series of drawing blocks, complemental dies, means for rotating all the blocks at different peripheral speeds, the increase in the peripheral speed of each succeeding block being less than that required to take up the wire wound on the preceding block, means permitting the withdrawal of the wire from each block without regard to the speed of rotation thereof, and means on each block for maintaining a slight tension upon the wire accumulated thereon.

3. In apparatus for drawing wire continuously through a succession of dies, a series of dies, a series of hollow drawing blocks each adapted to receive and accumulate the drawn wire and being provided with tensioning means through which said wire is led to the next succeeding die, substantially as described.

4. In apparatus for drawing wire by the continuous method, a series of dies, a series of drawing blocks, each providing an axial delivery passage for the wire, a dome head on each block by which the wire is guided from the periphery of said block to said axial passage, a peripheral tension device on each block, and means for guiding the wire as delivered axially from each block to the next succeeding die.

5. In apparatus for drawing wire by the continuous method, a series of dies, a series of drawing blocks, means on each block for permitting the delivery of wire therefrom without regard to the speed of rotation of said block, and tension means operable on the wire as it leaves the periphery of each block.

6. In apparatus for drawing wire by the continuous method, a series of dies, a series of rotating blocks, means permitting the delivery of wire from each of said blocks by the uncoiling of the convolutions thereon, and means on each block for maintaining a slight tension upon the wire carried thereby.

7. In apparatus for drawing wire by the continuous method, a series of drawing blocks whereon the wire is normally wound up at a faster rate than it is delivered therefrom, means for withdrawing the wire wound on each block by movement over the end of said block, and means for preventing slippage of the wire on said blocks.

8. In apparatus of the class described, the combination with wire drawing instrumentalities including a block and die, of actuating means for imparting rotation to said block, means for obtaining the passage of wire onto said block at a rate corresponding to the peripheral speed imparted by said actuating means, and means permitting the withdrawal of wire from said block, during its rotation at the speed imparted by said actuating means, at rates different from said rate of passage onto the block.

9. In apparatus for drawing wire by the continuous method, a series of dies, a series of rotating blocks, means for guiding the wire as it leaves each block to a point approximately in the axis of said block, and means for frictionally retarding the passage of the wire from the periphery of said block.

10. In apparatus for drawing wire by the continuous method, a series of drawing blocks, each serving as a variable storage device for the wire in process of reduction, and means permitting the increase or decrease of the amount of wire held in storage on each block in accordance with the demands of the next succeeding block.

11. In the art of drawing wire by the continuous method, the improvement which consists in withdrawing the wire from each block by movement over the end of said block, whereby the rate of delivery from said block is unaffected by the speed of rotation thereof, and maintaining on the wire carried by each block a slight tension, whereby the wire is wound on the block at the peripheral speed of the latter.

12. The improvement in the art of drawing wire by the continuous method, which consists in rotating the drawing blocks at such peripheral speeds as will normally procure gradual accumulation of the wire on each block, and withdrawing the wire from each block without regard to the speed of rotation of same.

13. In the art of drawing wire, the improvement which consists in delivering the wire from the drawing block in a direction that permits of uncoiling, whereby said delivery is unaffected by the block's rotation, and maintaining sufficient tension on the wire to prevent slippage on said block.

Dated this 13th day of January, 1921.

ROBERT DUNCAN CONNOR.